United States Patent
Kosuge et al.

(10) Patent No.: US 9,308,966 B2
(45) Date of Patent: Apr. 12, 2016

(54) SADDLE TYPE ELECTRIC VEHICLE

(71) Applicant: KAWASAKI JUKOGYO KABUSHIKI KAISHA, Kobe-shi, Hyogo (JP)

(72) Inventors: Hideyoshi Kosuge, Kobe (JP); Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/433,374

(22) PCT Filed: Jul. 3, 2013

(86) PCT No.: PCT/JP2013/004115
§ 371 (c)(1),
(2) Date: Apr. 2, 2015

(87) PCT Pub. No.: WO2014/054204
PCT Pub. Date: Apr. 10, 2014

(65) Prior Publication Data
US 2015/0232150 A1    Aug. 20, 2015

(30) Foreign Application Priority Data

Oct. 3, 2012  (WO) ................. PCT/JP2012/006333

(51) Int. Cl.
*B62K 11/00* (2006.01)
*B62M 7/02* (2006.01)
*B62K 11/04* (2006.01)
*B62K 25/28* (2006.01)

(52) U.S. Cl.
CPC .................. *B62M 7/02* (2013.01); *B62K 11/04* (2013.01); *B62K 25/283* (2013.01); *B62K 2204/00* (2013.01)

(58) Field of Classification Search
CPC .. B62K 2204/00; B62K 2208/00; B62M 7/02
See application file for complete search history.

(56) References Cited

U.S. PATENT DOCUMENTS

2003/0094324 A1* 5/2003 Huang .......................... 180/220
2009/0255747 A1* 10/2009 Kasaba et al. ................ 180/208

(Continued)

FOREIGN PATENT DOCUMENTS

JP    S58004326 A    1/1983
JP    H03281490 A    12/1991

(Continued)

OTHER PUBLICATIONS

ISA Japanese Patent Office, International Search Report Issued in Japanese Patent Application PCT/JP2012/006333, Jan. 15, 2013, WIPO, 2 pages.

(Continued)

*Primary Examiner* — Tony Winner
(74) *Attorney, Agent, or Firm* — Alleman Hall McCoy Russell & Tuttle LLP

(57) ABSTRACT

A saddle type electric vehicle which travels by using an electric motor as a power source includes: a power supply unit including a power supply for the electric motor; and a vehicle body frame defining an accommodating space located between front and rear wheels and accommodating the power supply unit. The vehicle body frame is configured such that the power supply unit is attachable to and detachable from the accommodating space in a vehicle width direction.

11 Claims, 8 Drawing Sheets

(56) References Cited

U.S. PATENT DOCUMENTS

| | | | |
|---|---|---|---|
| 2010/0078247 A1* | 4/2010 | Sasage et al. | 180/220 |
| 2013/0032427 A1* | 2/2013 | Ishikawa et al. | 180/220 |
| 2013/0264134 A1* | 10/2013 | Matsuda | 180/68.1 |
| 2013/0299265 A1* | 11/2013 | Marazzi | 180/220 |

FOREIGN PATENT DOCUMENTS

| | | |
|---|---|---|
| JP | H04201687 A | 7/1992 |
| JP | H09163620 A | 6/1997 |
| JP | 2000115902 A | 4/2000 |
| JP | 2001138976 A | 5/2001 |
| JP | 2002025631 A | 1/2002 |
| JP | 2002240765 A | 8/2002 |
| JP | 2002268913 A | 9/2002 |
| JP | 2003127941 A | 5/2003 |
| JP | 2003182669 A | 7/2003 |
| JP | 2003267278 A | 9/2003 |
| JP | 2004362949 A | 12/2004 |
| JP | 2006205894 A | 8/2006 |
| JP | 2007083953 A | 4/2007 |
| JP | 2008104257 A | 5/2008 |
| JP | 2009165210 A | 7/2009 |
| JP | 2009283457 A | 12/2009 |
| JP | 2010022155 A | 1/2010 |
| JP | 2010083332 A | 4/2010 |
| JP | 2010100124 A | 5/2010 |
| JP | 2010208382 A | 9/2010 |
| JP | 2010239705 A | 10/2010 |
| JP | 2011076903 A | 4/2011 |
| JP | 2012050272 A | 3/2012 |
| JP | 2012060705 A | 3/2012 |
| JP | 2012068887 A | 4/2012 |
| JP | 2012131414 A | 7/2012 |
| JP | 2012144178 A | 8/2012 |
| JP | 2013147153 A | 8/2013 |
| WO | 2012032621 A1 | 3/2012 |
| WO | 2012063292 A1 | 5/2012 |
| WO | 2012070109 A1 | 5/2012 |

OTHER PUBLICATIONS

ISA Japanese Patent Office, International Search Report Issued in Japanese Patent Application PCT/JP2013/004115, Sep. 3, 2013, WIPO, 2 pages.

ISA Japanese Patent Office, International Search Report Issued in Japanese Patent Application PCT/JP2013/004116, Oct. 1, 2013, WIPO, 2 pages.

ISA Japanese Patent Office, International Search Report Issued in Japanese Patent Application PCT/JP2013/004117, Oct. 1, 2013, WIPO, 2 pages.

* cited by examiner

SADDLE TYPE ELECTRIC VEHICLE

TECHNICAL FIELD

The present invention relates to a saddle type electric vehicle including an accommodating space located between front and rear wheels and accommodating a power supply unit.

BACKGROUND ART

To secure a cruising distance, a saddle type electric vehicle needs to be equipped with a battery box accommodating a large-capacity battery. In PTL 1, a large battery box is supported by a main frame from below and accommodated in a vehicle body cover attached to a vehicle body frame.

CITATION LIST

Patent Literature

PTL 1: Japanese Laid-Open Patent Application Publication No. 2010-100124

SUMMARY OF INVENTION

Technical Problem

To accommodate the battery box in the vehicle body cover as above, the battery box needs to be lifted up once to a position higher than the vehicle body frame. Therefore, a work of mounting the battery box to the vehicle body frame is complex, and an apparatus for lifting up the battery box to a high position is large.

An object of the present invention is to provide a saddle type electric vehicle configured such that a power supply can be easily mounted to a vehicle body.

Solution to Problem

A saddle type electric vehicle according to the present invention is a saddle type electric vehicle which travels by using an electric motor as a power source, the saddle type electric vehicle comprising: a power supply unit including a power supply for the electric motor; and a vehicle body frame defining an accommodating space located between front and rear wheels and accommodating the power supply unit, wherein the vehicle body frame is configured such that the power supply unit is attachable to and detachable from the accommodating space in a vehicle width direction.

According to the above configuration, the vehicle body frame is detached, and the power supply unit is lifted up to a height which is substantially the same as the height of the mounting state. With this, by just moving the power supply unit in the vehicle width direction, the power supply unit can be accommodated in the accommodating space. As above, it becomes unnecessary to lift up the power supply unit to a high position, and the power supply unit can be easily mounted to the vehicle body.

The saddle type electric vehicle may be configured such that: the vehicle body frame includes a detachable frame portion located at an outer side of the power supply unit in the vehicle width direction and defining the accommodating space; the detachable frame portion is detachably coupled to a remaining portion of the vehicle body frame; and by detaching the detachable frame portion from the remaining portion, the accommodating space is open in the vehicle width direction.

According to the above configuration, by detaching the detachable frame portion, the power supply unit can be moved in the vehicle width direction to be attached to or detached from the vehicle body. By attaching the detachable frame portion, the power supply unit accommodated in the accommodating space can be protected in the vehicle width direction.

The saddle type electric vehicle may be configured such that the detachable frame portion is detachably fastened to the remaining portion by fastening members inserted into and disengaged from the remaining portion in the vehicle width direction in a state where front and rear end portions of the detachable frame portion contact the remaining portion from vehicle width direction outer sides.

According to the above configuration, since the load can be supported by the contact portions, the stiffness of the entire vehicle body frame improves.

The saddle type electric vehicle may be configured such that: the vehicle body frame includes a head pipe and a pair of left and right main frames extending rearward from the head pipe; and the detachable frame portion constitutes at least one of the main frames.

According to the above configuration, since only one of the main frames is detachable, the stiffness of the vehicle body frame can be increased.

The saddle type electric vehicle may be configured such that: the head pipe includes a cylindrical pipe portion and a box-shaped joint portion provided at a rear portion of the pipe portion; and the main frames are respectively coupled to left and right rear portions of the joint portion.

According to the above configuration, since the joint portion is formed in a box shape, the stiffness of the joint portion can be increased. Therefore, even in a case where a part of the vehicle body frame is detachable, the stiffness of the entire vehicle body frame can be secured.

The saddle type electric vehicle may further include: a power transmission mechanism configured to transmit driving force, generated by the electric motor, to a driving wheel, wherein: the power transmission mechanism may be provided at one of two vehicle width direction sides relative to a vehicle width center line; the detachable frame portion may constitute one of the main frames; and the one main frame may be provided at the other vehicle width direction side opposite to the one vehicle width direction side where the power transmission mechanism is provided.

According to the above configuration, in a case where the vehicle body frame includes a pair of main frames, the load acting on the main frame located at the vehicle width direction side where the power transmission mechanism is provided becomes higher than the load acting on the main frame located at the opposite side. The main frame located at the opposite side is configured to be detachable, and the main frame integrated with the head pipe is arranged at the side where the power transmission mechanism is provided. Therefore, the load acting from the power transmission mechanism can be satisfactorily supported by the vehicle body frame, and the ease of attaching and detaching the power supply unit can be secured by configuring the accommodating space which is openable and closable.

The saddle type electric vehicle may be configured such that: the detachable frame portion constitutes one of the main frames; and the other main frame has a greater stiffness than the one main frame.

According to the above configuration, the load acting on the vehicle body frame can be supported by the other main frame.

The saddle type electric vehicle may be configured such that: the power supply unit includes a supporting body supporting the power supply from below; and the supporting body is supported by the remaining portion via the detachable frame portion.

According to the above configuration, the load acting on the vehicle body frame from the power supply when the power supply unit is attached can be supported by the remaining portion.

The saddle type electric vehicle may be configured such that the supporting body is coupled to the detachable frame portion at a plurality of positions spaced apart from one another in a forward and rearward direction.

The saddle type electric vehicle may further include a power transmission mechanism configured to transmit driving force, generated by the electric motor, to a driving wheel, wherein the electric motor and the power transmission mechanism may be arranged so as not to overlap the accommodating space in a side view.

Advantageous Effects of Invention

The present invention can provide a saddle type electric vehicle configured such that a power supply can be easily mounted to a vehicle body.

DESCRIPTION OF EMBODIMENTS

Figure 1:
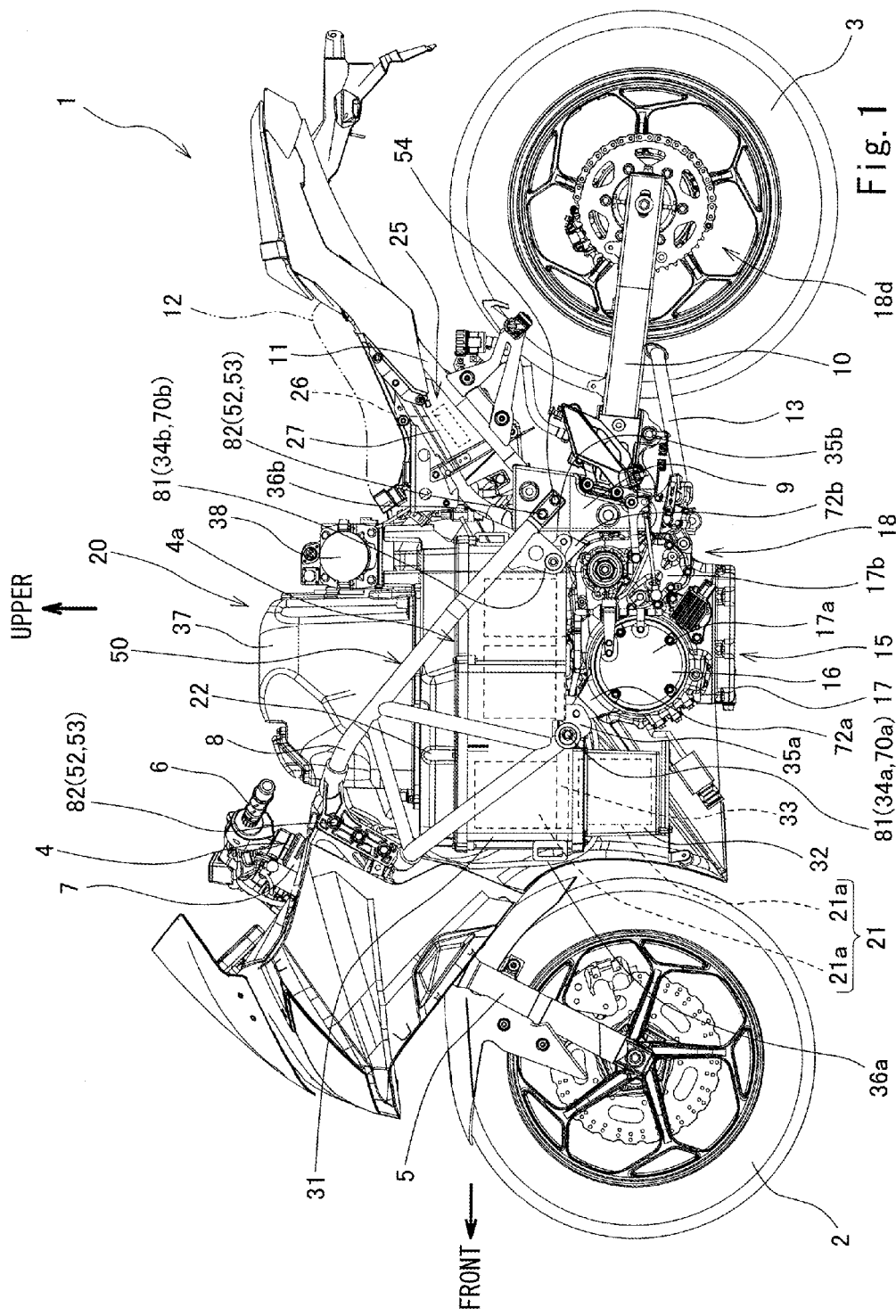
FIG. 1 is a left side view of an electric motorcycle shown as one example of a saddle type electric vehicle according to an embodiment.

Hereinafter, an embodiment will be explained in reference to the drawings. In the drawings, the same reference signs are used for the same or corresponding components, and a repetition of the same explanation is avoided. The directions described below are from the perspective of a rider straddling an electric motorcycle shown as one example of a saddle type electric vehicle. A vehicle lengthwise direction corresponds to a forward and rearward direction, and a vehicle width direction corresponds to a rightward and leftward direction. In plan view, a vehicle width outer side and a vehicle width outer direction are respectively a side and a direction, each of which is away from a vehicle width center line in the vehicle width direction, the vehicle width center line extending in the vehicle lengthwise direction, and a vehicle width inner side and a vehicle width inner direction are respectively a side and a direction, each of which is toward the vehicle width center line in the vehicle width direction.

Figure 2:
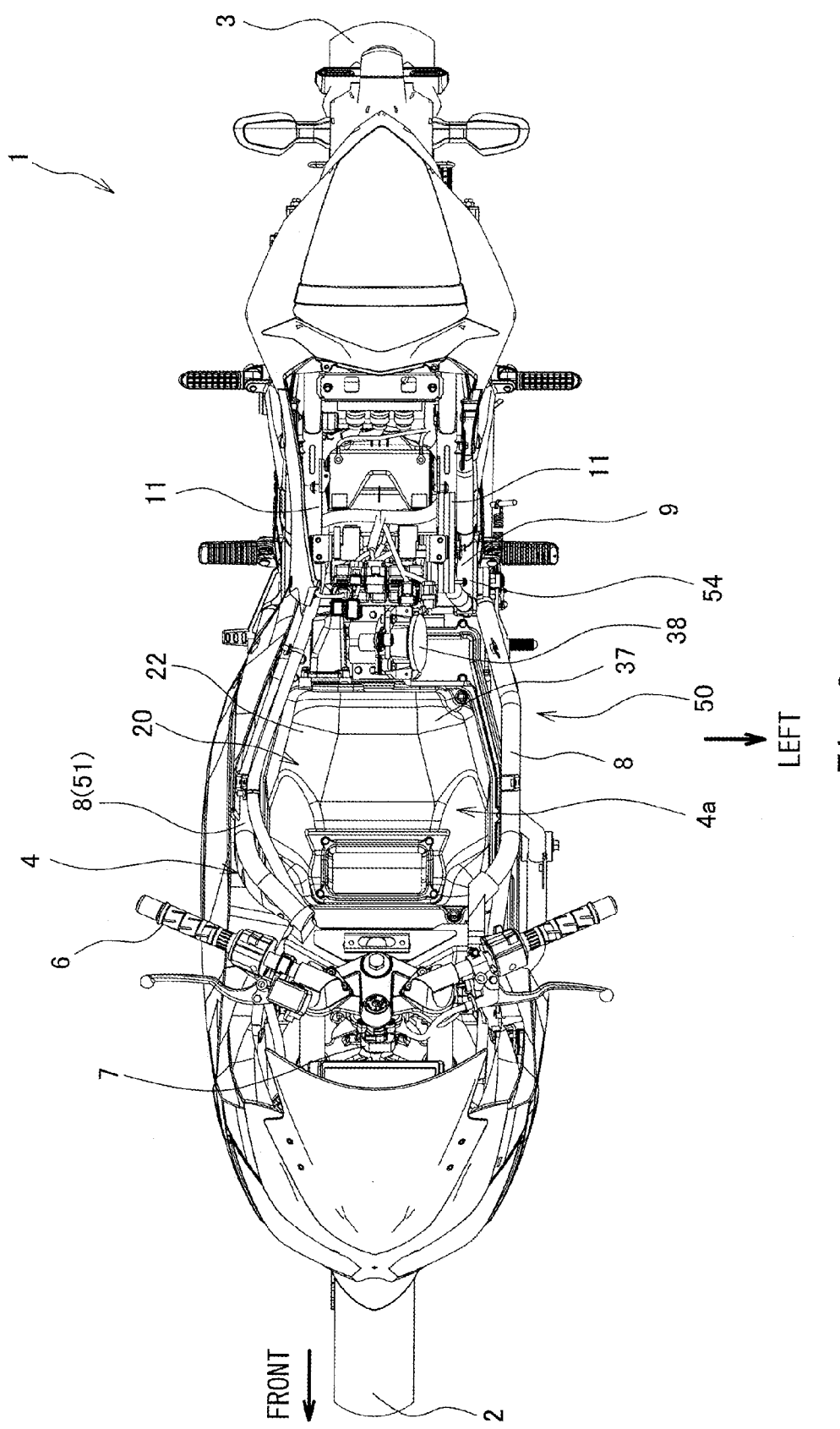
FIG. 2 is a plan view of the electric motorcycle shown in FIG. 1.

FIG. 1 is a left side view of an electric motorcycle 1 shown as one example of the saddle type electric vehicle according to the embodiment. FIG. 2 is a plan view of the electric motorcycle 1 shown in FIG. 1. As shown in FIGS. 1 and 2, the electric motorcycle 1 includes a front wheel 2, a rear wheel 3, and a vehicle body frame 4. The front wheel 2 is a steered wheel and a driven wheel, and the rear wheel 3 is a driving wheel. The front wheel 2 is rotatably supported by a lower end portion of a front fork 5. The front fork 5 extends upward from the lower end portion, pivotally supporting the front wheel 2, while inclining rearward at a caster angle. An upper end portion of the front fork 5 is coupled to a handle 6 via a bracket together with a steering shaft extending in parallel with the front fork 5. The vehicle body frame 4 includes a head pipe 7, a pair of left and right main frames 8, and a pivot frame 9. The head pipe 7 rotatably supports the steering shaft. The left and right main frames 8 extend rearward from the head pipe 7, and rear end portions thereof are respectively coupled to left and right side walls of the pivot frame 9. The pivot frame 9 supports a front end portion of a swing arm 10, extending in the vehicle lengthwise direction, such that the swing arm 10 is swingable around an axis extending in the vehicle width direction. The rear wheel 3 is rotatably supported by a rear end portion of the swing arm 10.

A seat frame 11 is located above the swing arm 10 and extends rearward from an upper portion of the pivot frame 9. A seat 12 for a rider is supported on the seat frame 11. A side stand 13 is attached to a lower portion of one of the left and right side walls of the pivot frame 9 so as to be swingable. When the motorcycle is traveling, the side stand 13 is set in a horizontal posture so as not to contact the ground. When the motorcycle is parked, the side stand 13 is set in a downward posture to contact the ground together with the front and rear wheels 2 and 3. With this, the electric motorcycle 1 stands in an inclined posture. In this inclined posture, the vehicle width center line extending in an upper-lower direction in a rear view extends upward from the vicinity of a ground contact point of the rear wheel 3 so as to be slightly inclined toward one of the left and right sides relative to a vertical direction.

The electric motorcycle 1 includes a motor unit 15, a power supply unit 20, and an inverter unit 25. The motor unit 15 includes: an electric motor 16 as a power source configured to rotate the driving wheel 3; and a motor case 17 accommodating the electric motor 16 and supporting a motor shaft. The following will explain an example in which the power source does not include an internal combustion engine. However, the internal combustion engine may be included in addition to the electric motor 16.

The power supply unit 20 includes: a power supply 21 for the electric motor 16; and a power supply case 22 accommodating the power supply 21. The power supply 21 can store DC power. In a case where the electric motor 16 is driven by a voltage higher than a voltage by which the other electric components (such as a lamp device, an alarm device, and a control device) are driven, the power supply 21 may be exclusively used for the electric motor 16, and the electric motorcycle 1 may include a low-voltage power supply (not shown) for the other electric components in addition to the power supply 21. In this case, the power supply case 22 only needs to accommodate at least the power supply 21 and does not have to accommodate the low-voltage power supply.

The inverter unit 25 includes: an inverter 26 capable of converting DC, discharged from the power supply 21, into AC; and an inverter case 27 accommodating the inverter 26. The inverter 26 is connected to the power supply 21 via a DC electric wire and is connected to the electric motor 16 via an AC electric wire. When the AC is supplied from the inverter 26 to the electric motor 16, the electric motor 16 generates driving force, and the motor shaft rotates. Thus, the driving force of the electric motor 16 (i.e., the rotation of the motor shaft) is transmitted to the driving wheel 3 through a power transmission mechanism 18.

The power transmission mechanism 18 may include: a reducer configured to decelerate the rotation of the motor shaft; a transmission unit configured to decelerate the decelerated rotation continuously or stepwise at a variable reduction ratio; and a clutch configured to allow or cut off transmission of the rotation from the reducer to the transmission unit. The motor shaft (corresponding to an input shaft of the reducer), an input shaft of the transmission unit (corresponding to an output shaft of the reducer), and an output shaft of the transmission unit extend in the vehicle width direction. The transmission unit is arranged behind the electric motor 16, and the clutch is provided at one vehicle width direction end portion (for example, a right-side end portion) of the input shaft of the transmission unit.

Figure 6:
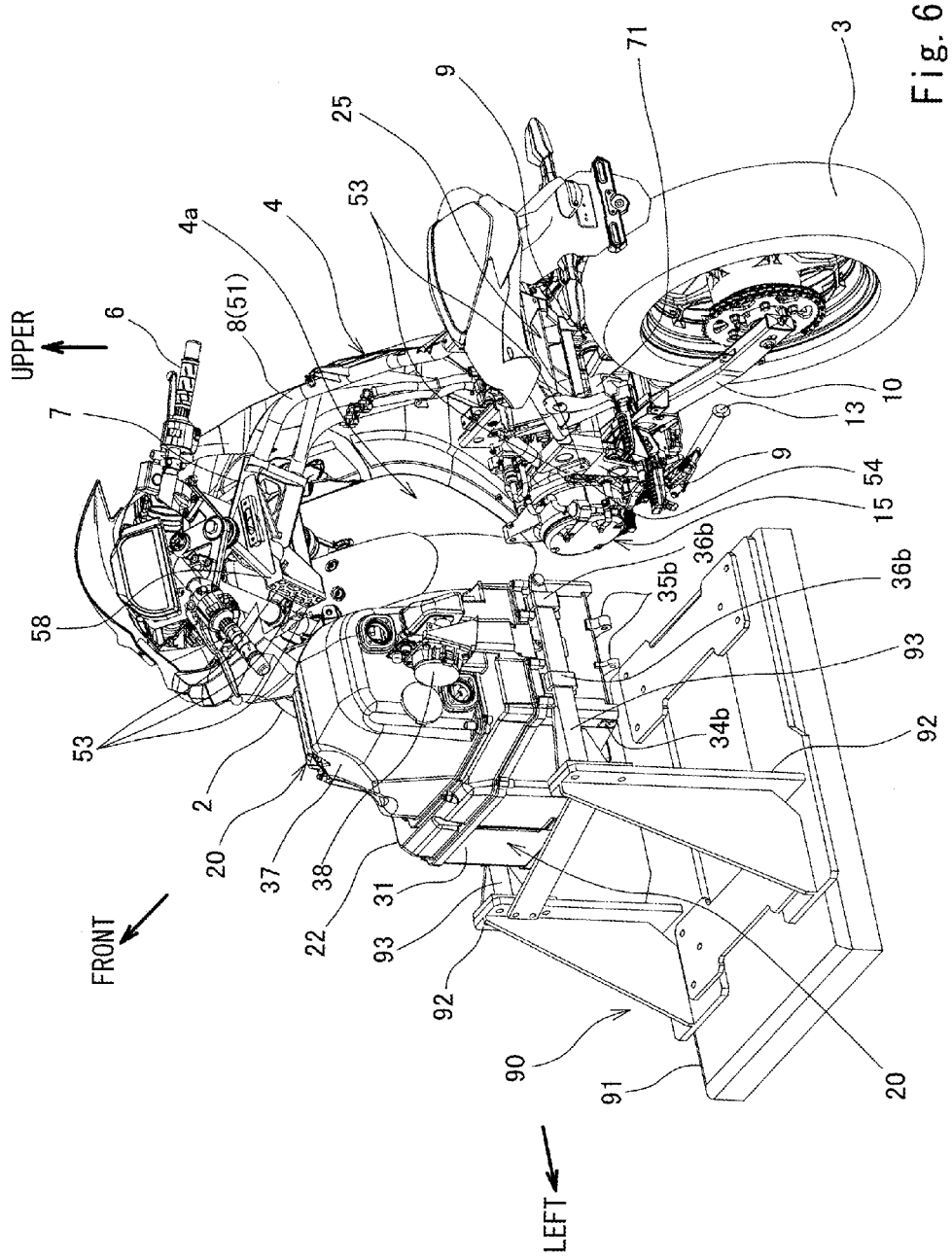
FIG. 6 is a perspective view showing a state before the power supply unit is mounted to a vehicle body of the electric motorcycle shown in FIG. 1.
Figure 8:
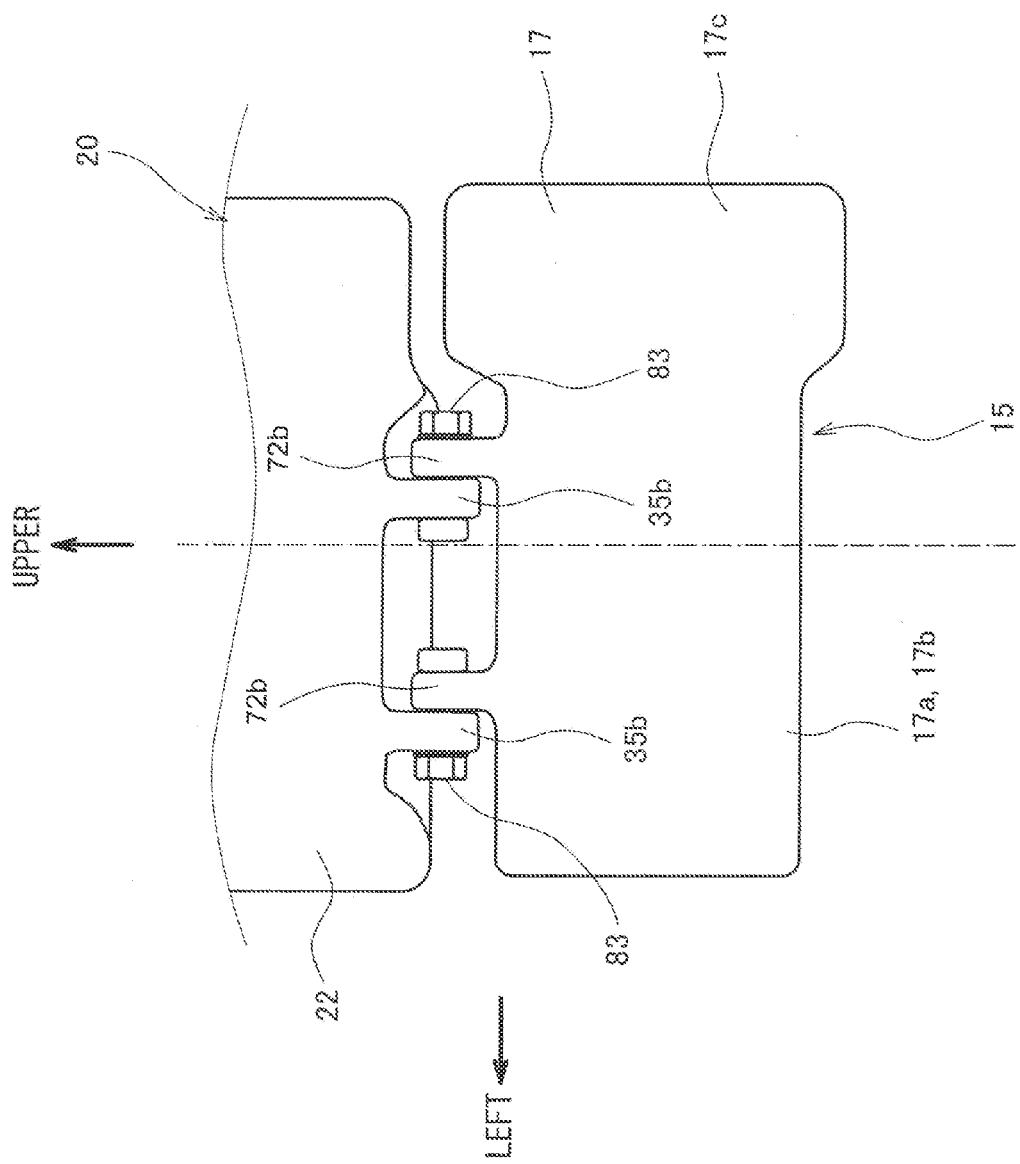
FIG. 8 is a diagram showing the arrangement of first and second mount portions of the electric motorcycle shown in FIG. 1.

The motor case 17 integrally includes: a transmission unit accommodating section 17b accommodating the transmission unit and provided behind a motor accommodating section 17a accommodating the electric motor 16; and a clutch accommodating section 17c accommodating the clutch and provided adjacent to the transmission unit accommodating section 17b in the vehicle width direction (see FIGS. 6 and 8). The components of the power transmission mechanism 18 accommodated in the motor case 17 also constitute a part of the motor unit 15, and the output shaft of the transmission unit serves as a final output shaft of the motor unit 15. In a case where the power transmission mechanism 18 does not include the transmission unit, the output shaft of the reducer serves as the final output shaft. In a case where the power transmission mechanism 18 does not include both the reducer and the transmission unit, the motor shaft serves as the final output shaft.

The power transmission mechanism 18 includes a drive mechanism 18d configured to transmit the rotation of the final output shaft of the motor unit 15 to an axle of the driving wheel 3. For example, a chain transmission mechanism, a belt transmission mechanism, or an assembly of bevel gears and a drive shaft can be applied as the drive mechanism 18d. The final output shaft projects from one of vehicle width direction side walls (for example, a left side wall) of the motor case 17 toward one of vehicle width direction sides (for example, a left side). It is preferable that the final output shaft project toward an opposite side of the clutch accommodating section 17c (see FIGS. 6 and 8) in the vehicle width direction. Although the clutch has a relatively large diameter among the components accommodated in the motor case 17, the final output shaft can be easily prevented from interfering with the clutch.

The drive mechanism 18d includes: a driving element fixed onto a projecting end portion of the final output shaft; a driven element fixed onto one of vehicle width direction end portions (for example, a left-side end portion) of the axle of the driving wheel 3; and a transmission element configured to transmit the rotation of the driving element to the driven element. Examples of the driving element and the driven element include a sprocket, a pulley, and a bevel gear train, and examples of the transmission element include a chain, a belt, and a drive shaft. The drive mechanism 18d is arranged at one vehicle width direction side (for example, a left side) of the vehicle width center line. As one example, the transmission element is provided at the vehicle width outer side of the motor case 17 and extends in the vehicle lengthwise direction.

The power supply case 22 is physically separated from the motor case 17 and the inverter case 27. In the present embodiment, the motor case 17 and the inverter case 27 are also physically separated from each other, so that these three cases 17, 22, and 27 are separated from one another. An accommodating space 4a accommodating the power supply unit 20 is defined by the vehicle body frame 4 so as to be located between the front wheel 2 and the rear wheel 3. The accommodating space 4a is formed substantially between the left and right main frames 8. In a state where the power supply unit 20 is accommodated in the accommodating space 4a and mounted to the vehicle body (hereinafter referred to as a "mounted state"), the power supply unit 20 overlaps the left and right main frames 8 in a side view and is located at the vehicle width inner side of the left and right main frames 8.

The motor unit 15 is located lower than the accommodating space 4a and the power supply unit 20. However, as described below, the power supply unit 20 may include a downward projecting portion located at a front portion thereof, and the downward projecting portion may be located in front of the motor unit 15 so as to be substantially the same in height as the motor unit 15. The motor unit 15 is located lower than the main frames 8 and in front of the pivot frame 9. The motor unit 15 is supported by the pivot frame 9 and is also supported by the power supply unit 20. The inverter unit 25 is located behind the accommodating space 4a and the power supply unit 20 and behind and above the motor unit 15. The inverter unit 25 may be supported by a front end portion of the seat frame 11 and/or an upper portion of the pivot frame 9 and may be interposed between the pivot frame 9 and the seat frame 11 and constitute a part of the vehicle body frame 4.

In the present embodiment, the vehicle body frame 4 is configured such that the power supply unit 20 can move in the vehicle width direction to be attached to and detached from the accommodating space 4a. For example, a part of the vehicle body frame 4 is detachable from a remaining portion of the vehicle body frame 4. By detaching this part of the vehicle body frame 4, the accommodating space 4a is open in the vehicle width direction, and the power supply unit 20 can be inserted into the accommodating space 4a in the vehicle width direction through this open portion and can be taken out from the accommodating space 4a in the vehicle width direction through this open portion.

Therefore, to accommodate the power supply unit 20 in the accommodating space 4a, first, a bottom portion of the power supply unit 20 only needs to be lifted up to a bottom portion of the accommodating space 4a. In other words, the power supply unit 20 only needs to be lifted up to a height which is substantially the same as the height of the mounted state. After that, by moving the power supply unit 20 in the vehicle width direction, the power supply unit 20 can be inserted into the accommodating space 4a. As above, by moving the power supply unit 20 relative to the accommodating space 4a in a horizontal direction, the power supply unit 20 can be attached to and detached from the vehicle body. In other words, the power supply unit 20 can be attached and detached without being moved to a position higher than the accommodating space 4a. With this, the complexity of the mounting work is reduced, and even in a case where the power supply unit 20 is large, the power supply unit 20 can be easily mounted to the vehicle body. The work of pulling out the power supply unit 20 from the accommodating space 4a is also facilitated.

The power supply unit 20 moves in the vehicle width direction to be inserted into or removed from the accommodating space 4a. Therefore, even in a case where the handle 6 covers from above a space immediately behind the front fork 5, the space can be utilized as the accommodating space 4a. On this account, both the securing of the caster angle (i.e., a straight traveling property of the motorcycle) and the increase in size of the power supply 21 can be realized. As will be described later, according to the present embodiment, the head pipe 7 adopts a box structure, and the stiffness of the vehicle body frame 4 is secured although the vehicle body frame 4 includes a detachable frame. Since the power supply unit 20 moves in the vehicle width direction to be inserted into or removed from the accommodating space 4a, a space under the box structure can also be utilized as the accommodating space 4a. Therefore, while realizing both the structure for opening the accommodating space 4a in the vehicle width direction and the securing of the stiffness of the vehicle body frame 4, the power supply 21 can be increased in size.

Hereinafter, the configurations of the power supply unit 20 and the vehicle body frame 4 according to the present embodiment will be explained in more detail.

As shown in FIG. 1, the power supply case 22 includes a main case portion 31 accommodating the power supply 21. The main case portion 31 includes a peripheral wall having a closed-circular plane cross section, and the power supply 21 is surrounded by the peripheral wall. The power supply case 22 includes a downward projecting portion 32 projecting downward from a front portion of the main case portion 31, and the power supply 21 is also accommodated in the downward projecting portion 32. In other words, the main case portion 31 includes a rearward projecting portion projecting rearward when viewed from the downward projecting portion 32.

The power supply 21 includes a plurality of power supply modules 21a electrically connected to one another in series and/or in parallel. Each of the power supply modules 21a includes a plurality of battery cells electrically connected to one another in series and/or in parallel. These battery cells are densely arranged, so that the entire power supply module 21a is formed in a rectangular solid shape. The plurality of power supply modules 21a are distributedly accommodated in the main case portion 31 and the downward projecting portion 32.

The power supply case 22 includes a supporting body 33 supporting from below the power supply 21 accommodated in the main case portion 31. The supporting body 33 is provided at a bottom portion of the main case portion 31 along the peripheral wall of the main case portion 31. For example, the supporting body 33 is attached to an inner surface of the peripheral wall of the main case portion 31. The supporting body 33 projects horizontally from a lower end of the peripheral wall of the main case portion 31 toward an inner side of the peripheral wall and forms a supporting surface facing upward at a bottom portion inside the peripheral wall. This supporting surface supports from below the power supply 21 accommodated in the main case portion 31. The main case portion 31 can be reinforced by attaching the supporting body 33. The supporting body 33 only needs to provide such a supporting surface for the power supply case 22. Therefore, the supporting body 33 may be attached to the lower end of the peripheral wall of the main case portion 31 from below.

The supporting body 33 includes an opening which is located at the bottom portion of the main case portion 31 and at a boundary portion between the supporting body 33 and the downward projecting portion 32 and through which a wiring body extends. The wiring body electrically connects the power supply modules accommodated in the downward projecting portion 32 to the power supply modules accommodated in the main case portion 31. To prevent muddy water and flying stones from getting into the main case portion 31 from below, the supporting body 33 seals the inside of the peripheral wall at a rearward portion (i.e., a bottom portion of the above-described rearward projecting portion), located behind the downward projecting portion 32, of the bottom portion of the main case portion 31.

In the mounted state, the power supply case 22 is fixed to the left and right main frames 8 arranged at the vehicle width outer sides of the power supply case 22. The supporting body 33 includes engagement holes 34a and 34b with which fastening members 81 for fixing the power supply case 22 engage. The engagement holes 34a and 34b face the vehicle width direction and are open on left and right outer surfaces of the power supply case 22. The engagement holes 34a and 34b are formed at portions which connect left and right end portions of the supporting body 33 with each other in the vehicle width direction. Therefore, the left and right main frames 8 are coupled to each other in the vehicle width direction via the supporting body 33. Thus, the supporting body 33 reinforces the vehicle body frame 4 and constitutes a part of the vehicle body frame 4 (i.e., a cross frame coupling the left and right main frames 8 to each other in the vehicle width direction). The engagement holes 34a and 34b are separately provided at the front and rear sides.

The power supply case 22 includes a plurality of first mount portions 35a and 35b for coupling with the motor unit 15. In a left side view, the power supply case 22 is formed to have a shape obtained by turning an L shape to the right at 90 degrees. The motor unit 15 is arranged in a space secured at a rear lower side of the power supply case 22 having such a shape. To be specific, the motor unit 15 is arranged at a position which is under the main case portion 31, is substantially the same as the position of the main case portion 31 in the vehicle lengthwise direction and the vehicle width direction, is behind the downward projecting portion 32, and is substantially the same as the position of the downward projecting portion 32 in the upper-lower direction and the vehicle width direction. The first mount portions 35a and 35b are arranged at a bottom portion of the main case portion 31 (especially, the above-described rearward projecting portion) and attached to the supporting body 33. The supporting body 33 is provided with two front first mount portions 35a respectively located at left and right sides of a rear end portion of the boundary portion or a front end portion of the rearward portion (i.e., a bottom front end portion of the above-described rearward projecting portion). The supporting body 33 is also provided with two rear first mount portions 35b respectively located at the left and right sides of the rear end portion of the supporting body 33.

As above, the supporting body 33 is utilized for supporting the power supply 21, reinforcing the power supply case 22, sealing the power supply case 22, fixing the power supply unit 20 to the vehicle body frame 4, reinforcing the vehicle body frame 4, supporting the motor unit 15, and the like. The supporting body 33 may be made of a metal, such as an aluminum alloy. With this, the supporting body 33 obtains great stiffness, so that the stiffness for supporting the power supply 21 and the motor unit 15 and the strength of the reinforcement of the power supply case 22 and the vehicle body frame 4 improve. The peripheral wall of the main case portion 31 may be made of the same type of metal as the supporting body 33, and the supporting body 33 may be welded to the peripheral wall of the main case portion 31. With this, the sealing property of the power supply case 22 improves. The structure of the supporting body 33 is not especially limited as long as the above configurations and functions are realized.

Figure 3:
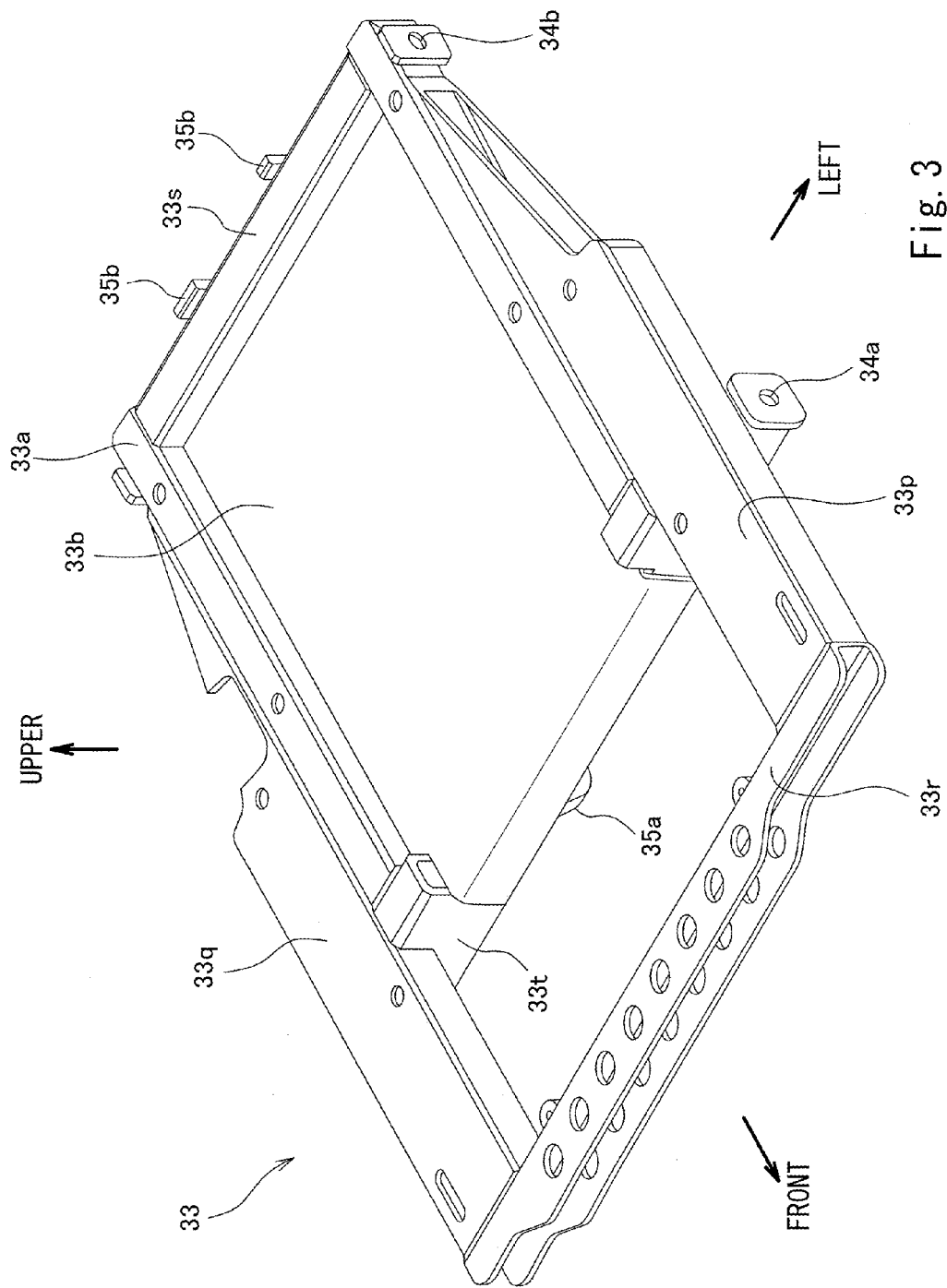
FIG. 3 is a perspective view showing one example of a supporting body of a power supply unit shown in FIG. 1.

FIG. 3 is a perspective view showing one example of the supporting body 33 shown in FIG. 1. For example, the supporting body 33 includes: a frame member 33a configured such that a plurality of square pipes are assembled in a frame shape so as to correspond to a cross-sectional plane shape of the main case portion 31 (see FIG. 1); and a plate member 33b configured to seal an inside of a rear portion of the frame member 33a. The plate member 33b seals the inside of the peripheral wall to prevent muddy water and the like from getting into the power supply case 22 (see FIG. 1). The frame member 33a includes: left and right pipes 33p and 33q respectively provided along left and right side walls of the peripheral wall; a front pipe 33r coupling front end portions of the left and right pipes 33p and 33q to each other and provided along a front side wall of the peripheral wall; and a rear pipe 33s coupling rear end portions of the left and right pipes 33p and 33q to each other and provided along a rear side wall of the peripheral wall. Upper surfaces of the pipes 33p to 33s form the above-described supporting surface, and the supporting surface is formed in a frame shape along the inner surface of the peripheral wall in a plan view.

In addition to the pipes constituting the frame member 33a, the supporting body 33 may include a coupling pipe 33t coupling vehicle lengthwise direction middle portions of the left and right pipes 33p and 33q to each other in the vehicle width direction. With this, the strength of the supporting body 33 improves. In addition, the coupling pipe 33t can be used as a component to which an upper rear edge of the downward projecting portion 32 (see FIG. 1) is attached and to which a front edge of the plate member 33b is joined. Thus, the downward projecting portion 32 is easily, liquid-tightly attached to the supporting body 33, and the plate member 33b is easily, liquid-tightly attached to the frame member 33a.

In a case where the supporting body 33 has the above structure, the engagement holes 34a and 34b are provided at left and right end portions of the coupling pipe 33t and the rear pipe 33s, respectively. With this, the supporting body 33 can reinforce the vehicle body frame 4 as described above. The front first mount portion 35a is attached to the coupling pipe 33t, and the rear first mount portions 35b are respectively attached to left and right portions of the rear pipe 33s.

Referring again to FIG. 1, the power supply case 22 includes an electric component accommodating portion 37 accommodating electric components, and the electric component accommodating portion 37 is located above the main case portion 31. Examples of the electric components include: a relay group configured to open or close wires connecting the power supply 21 to the inverter 26, the low-voltage power supply, and a charging connector 38; a DC/DC converter interposed on the wire connecting the power supply 21 to the low-voltage power supply; a service plug configured to open or close the wire connecting the power supply 21; a sensor group configured to detect an electric leakage, a current value, and the like of the power supply 21; and a power supply monitoring unit configured to monitor a state of the power supply 21. Electric circuits around the power supply 21 can be assembled in accordance with a flow which is different from a flow of assembling the vehicle body. Thus, the production efficiency of the vehicle improves.

The power supply unit 20 includes the charging connector 38 provided above the main case portion 31. The charging connector 38 constitutes the power supply unit 20. Further, the wire connecting the charging connector 38 to the power supply 21 and a charge monitoring unit constitute the power supply unit 20. Therefore, even in a case where the power supply unit 20 is detached from the vehicle body, maintenance, such as charge inspection of the power supply 21, can be performed.

Therefore, the power supply unit 20 can actually be stored and transported separately from the vehicle body. In the present embodiment, since the power supply unit 20 is simply mounted to the vehicle body, a workload at the time of assembly is small. Further, the power supply unit 20 can actually be sold or rented independently from the vehicle body. Even in this case, according to the present embodiment, a completed vehicle can be provided quickly.

Figure 4:
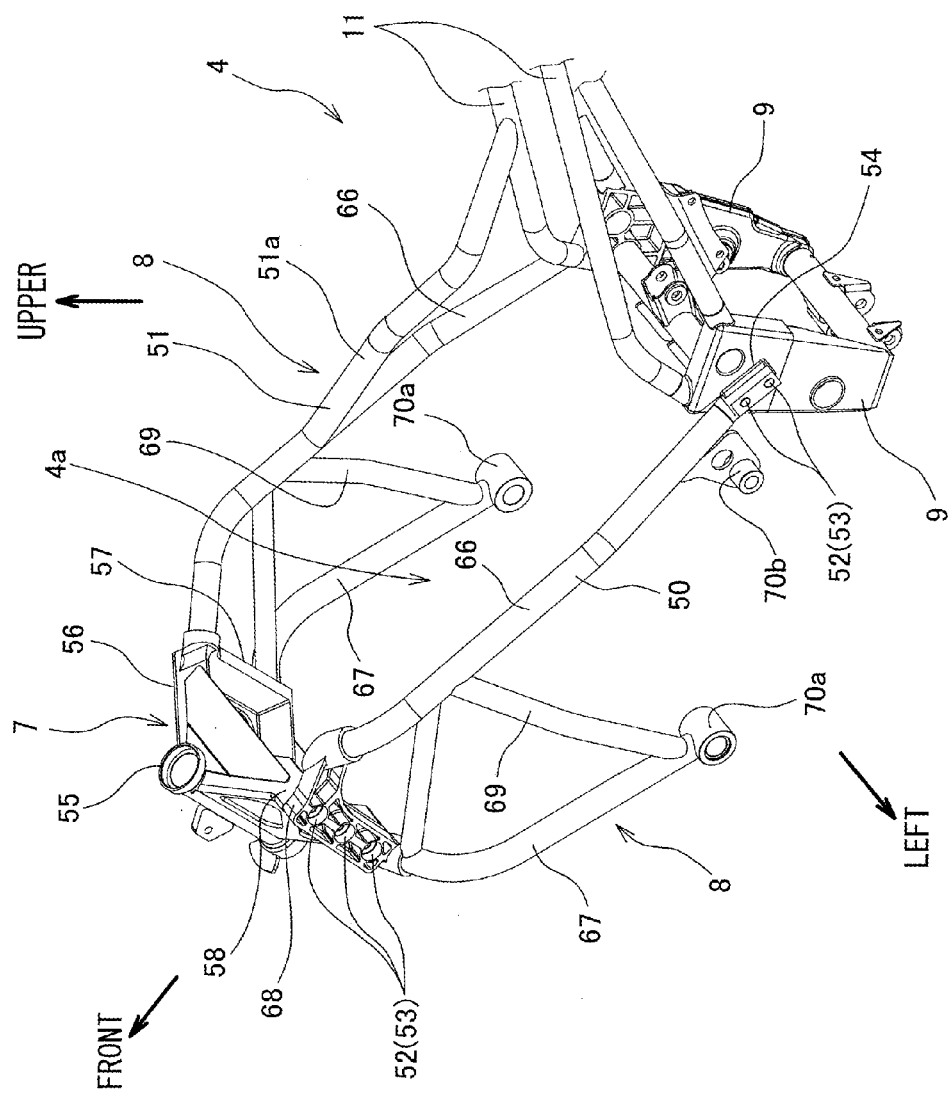
FIG. 4 is a perspective view of a vehicle body frame shown in FIG. 1.

FIG. 4 is a perspective view of the vehicle body frame 4 shown in FIGS. 1 and 2. As shown in FIG. 1, the vehicle body frame 4 is (especially, the left and right main frames 8 are) located at the vehicle width outer sides of the power supply unit 20 in the mounted state. As shown in FIG. 4, the vehicle body frame 4 includes a detachable frame portion 50 defining the accommodating space 4a. The detachable frame portion 50 is detachably coupled to the remaining portion of the vehicle body frame 4. By detaching the detachable frame portion 50 from the remaining portion, the accommodating space 4a is open in the vehicle width direction.

The detachable frame portion 50 is detachably fastened to the remaining portion by using fastening members 82 (see FIG. 1), inserted into and disengaged from the remaining portion in the vehicle width direction, in a state where front and rear end portions of the detachable frame portion 50 are brought into contact with the remaining portion from the vehicle width outer sides. The detachable frame portion 50 includes a plurality of through holes 52 through which the fastening members 82 are respectively inserted. The remaining portion includes a plurality of engagement holes 53 with which the fastening members 82 inserted through the through holes 52 respectively engage. The fastening members 82 are typically bolts, and the engagement holes 53 may be internal threads. The engagement holes 53 face the vehicle width direction. Therefore, the through holes 52 also face the vehicle width direction in a state where the detachable frame portion 50 is attached to the remaining portion. The fastening members 82 are also inserted into and disengaged from the remaining portion in the vehicle width direction.

The detachable frame portion 50 may constitute both of the main frames 8 or may constitute one of the main frames 8. Since the detachable frame portion 50 constitutes at least one of the main frames 8, the head pipe 7 and the pivot frame 9 constitute the above-described remaining portion. In a case where the detachable frame portion 50 constitutes only one of the main frames 8, the main frame 8 (hereinafter referred to as a "fixed main frame 51" for convenience of explanation) which is not constituted by the detachable frame portion 50 and is integrated with the head pipe 7 and the pivot frame 9 is also included in the remaining portion. When the detachable frame portion 50 is detached, the accommodating space 4a is open in the vehicle width direction and the upper direction. This open portion extends from the head pipe 7 to the pivot frame 9 in a side view. By using this large open portion, the large power supply unit 20 can be easily accommodated in the accommodating space 4a without being lifted up to a high position (also see FIG. 6).

The following explanation will be made on the basis that the detachable frame portion 50 constitutes only one of the main frames 8 (for example, the left main frame). The other main frame (i.e., the fixed main frame 51) may have a greater stiffness than the one main frame (i.e., the detachable frame portion 50). With this, the stiffness of the entire vehicle body frame 4 becomes great while one of the main frames 8 is configured to be detachable.

To improve the stiffness, the other main frame (fixed main frame 51) may include a connecting frame 51 a which branches from a part of a portion (corresponding to a main portion 66 described below) extending from the head pipe 7 toward the pivot frame 9 and is connected to the seat frame 11. In addition, the other main frame may be larger in thickness and/or outer shape than the one main frame.

The head pipe 7 as the remaining portion includes a structure by which the front end portion of the detachable frame portion 50 is detachably fastened to the head pipe 7. The pivot frame 9 as the remaining portion includes a structure by which the rear end portion of the detachable frame portion 50 is detachably fastened to the head pipe 7.

Without using the fastening members, a rear end portion of the fixed main frame 51 is connected to a side wall (for example, the right side wall) provided at a side where the fixed main frame 51 is provided, of the left and right side walls of the pivot frame 9. For example, the fixed main frame 51 may be welded to this side wall or may be formed integrally with this side wall. By using the fastening members 82, the rear end portion of the detachable frame portion 50 is detachably coupled to the side wall (for example, the left side wall) provided at a side where the detachable frame portion 50 is provided. A connection portion 54 is provided at a vehicle width outer side surface of this side wall. The rear end portion of the detachable frame portion 50 is brought into contact with the connection portion 54 from the vehicle width outer side and is detachably coupled to the connection portion 54 by using the fastening members 82. A part of the above-described engagement holes 53 (i.e., one or more engagement holes 53) is formed at the connection portion 54 and is open on a surface of the connection portion 54. One or more through holes 52 are formed at the rear end portion of the detachable frame portion 50 such that the number of through holes 52 and the positions of the through holes 52 respectively correspond to the number of engagement holes 53 and the positions of the engagement holes 53.

The head pipe 7 includes a cylindrical pipe portion 55 and a box-shaped joint portion 56 provided at a rear portion of the pipe portion 55. The above-described steering shaft (not shown) is inserted through and rotatably supported by the pipe portion 55. The main frames 8 are respectively coupled to left and right rear portions of the joint portion 56. The fixed main frame 51 is integrally coupled to one of the left and right rear portions of the joint portion 56 (for example, the right rear portion) by using a joining method, such as welding. The detachable frame portion 50 is detachably coupled to the other of the left and right rear portions of the joint portion 56 (for example, the left rear portion) by using the fastening members 82.

The joint portion 56 includes a joint plate 57 welded to a front end portion of the fixed main frame 51. The joint plate 57 is provided at a portion (for example, the right rear portion) to which the fixed main frame 51 is coupled, of the left and right rear portions of the joint portion 56. A surface of the joint plate 57 faces substantially rearward. The front end portion of the fixed main frame 51 is connected to this surface of the joint plate 57 without using the fastening members. For example, the fixed main frame 51 may be welded to the joint plate 57 or may be formed integrally with the joint portion 56. The joint portion 56 includes a connection plate 58. The connection plate 58 is provided at a portion (for example, the left rear portion) to which the detachable frame portion 50 is coupled, of the left and right rear portions of the joint portion 56. A surface of the connection plate 58 faces the vehicle width outer direction. The front end portion of the detachable frame portion 50 is brought into contact with the surface of the connection plate 58 from the vehicle width outer side and is detachably coupled to the connection plate 58 by using the fastening members 82. A part of the above-described engagement holes 53 (i.e., one or more engagement holes 53) is also formed at the connection plate 58 and is open on the surface of the connection plate 58. One or more through holes 52 are formed at the front end portion of the detachable frame portion 50 such that the number of through holes 52 and the positions of the through holes 52 respectively correspond to the number of engagement holes 53 and the positions of the engagement holes 53.

According to the above configuration, when attaching the detachable frame portion 50 to the remaining portion, the rear end portion of the detachable frame portion 50 is brought into contact with the surface of the connection portion 54 from the vehicle width outer side, and the front end portion of the detachable frame portion 50 is brought into contact with the surface of the connection plate 58 from the vehicle width outer side. Then, the through holes 52 are matched with the corresponding engagement holes 53. The fastening members 82 are inserted into the corresponding holes 52 and 53 from the vehicle width outer side of the detachable frame portion 50 toward the vehicle width inner side to engage with the engagement holes 53. With this, the detachable frame portion 50 constitutes one of the main frames 8, forms a pair with the fixed main frame 51, and extends from the head pipe 7 to the pivot frame 9. When detaching the detachable frame portion 50 from the remaining portion, a procedure opposite to the above is performed. The work of attaching and detaching the detachable frame portion 50 accompanies the work of attaching and detaching the power supply unit 20 to and from the vehicle body. Both of these works are performed at one side of the accommodating space 4a in the vehicle width direction. Therefore, the work efficiency of the work of attaching and detaching the power supply unit 20 improves (see FIG. 6).

The connection portion 54 may be provided with a plurality of (for example, two) engagement holes 53. In this case, the plurality of engagement holes 53 may be arranged on the connection portion 54 so as to be separated from one another in the upper-lower direction and the vehicle lengthwise direction. Further, the plurality of engagement holes 53 may be arranged so as to be separated from one another in the upper-lower direction or the vehicle lengthwise direction (the plurality of engagement holes 53 may be arranged so as to be the same in positions as one another in one of the vehicle lengthwise direction and the upper-lower direction). The same is true for the engagement holes 53 formed on the connection plate 58.

As described above, the joint portion 56 is formed in a box shape. Because of such a strong box structure of the joint portion 56, even in a case where one of the main frames 8 is detachable from the remaining portion of the vehicle body frame 4, the joint portion 56 can receive the load. Thus, the stiffness of the entire vehicle body frame 4 in an assembled state can be secured.

Figure 5:
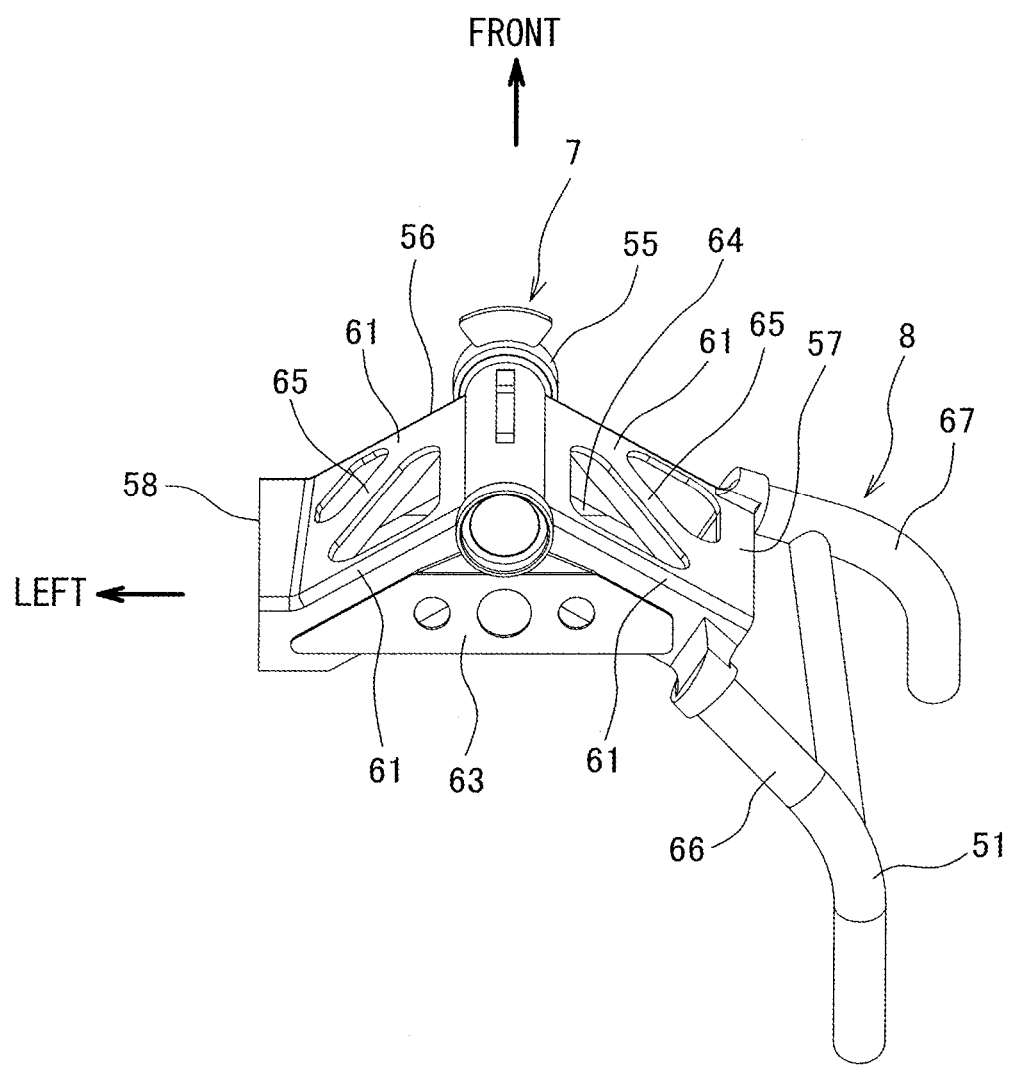
FIG. 5 is a plan view showing components around a head pipe shown in FIG. 4.

FIG. 5 is a plan view showing components around the head pipe 7 shown in FIG. 4. The joint portion 56 will be explained more specifically. As shown in FIGS. 4 and 5, the joint portion 56 includes a pair of left projecting portions 61 extending rearward from the head pipe 7 to the left side and a pair of right projecting portions 61 extending rearward from the head pipe 7 to the right side. The left projecting portions 61 are arranged in the upper-lower direction, and the right projecting portions 61 are arranged in the upper-lower direction. The above-described joint plate 57 couples rear end portions of the projecting portions 61 located at one of the left and right sides (for example, the right side) and arranged in the upper-lower direction. The above-described connection plate 58 couples rear end portions of the projecting portions 61 located at the other side (for example, the left side) and arranged in the upper-lower direction. The projecting portions 61 arranged at the upper side in the left-right direction are coupled to each other by a ceiling plate 64, and the projecting portions 61 arranged at the lower side in the left-right direction are coupled to each other by a bottom plate 63. The ceiling plate 64 and the bottom plate 63 are provided in a gusset shape which couples the left and right projecting portions 61 and the pipe portion 55. The projecting portions 61 arranged in the upper-lower direction are coupled to each other by an inclined portion 65. The inclined portion 65 is formed in a brace shape extending from the rear end portion of one of the projecting portions (for example, the projecting portion at the upper side) 61 to a front end portion of the other projecting portion (for example, the projecting portion at the lower side) 61. Front end portions of the inclined portions 65 at the left and right sides are respectively coupled to the projecting portions 61 which are located at one of the upper or lower sides.

Referring again to FIG. 4, each of the main frames 8 includes the main portion 66 which extends rearward from the head pipe 7 and inclines slightly downward to be coupled to the pivot frame 9. In addition, each of the main frames 8 includes a down portion 67 which is located under the main portion 66, extends downward from the head pipe 7, and inclines slightly rearward. Further, each of the main frames 8 includes a coupling portion 69 extending downward from a part of the main portion 66 to be connected to a lower end portion of the down portion 67. A front end portion of the main portion 66 is spaced apart from a front end portion of the down portion 67 in the upper-lower direction. The main frame 8 (especially, the main frame constituted by the detachable frame portion 30) includes a connecting plate 68 connecting these front end portions.

The detachable frame portion 50 may be coupled to the head pipe 7 in a state where an inner surface of the connecting plate 68 surface-contacts a surface of the connection plate 58. With this, the load acting on the detachable frame portion 50 can be received by these contacting surfaces. Thus, the stiffness of the entire vehicle body frame 4 improves. Similarly, an inner surface of the rear end portion of the detachable frame portion 50 may surface-contact a surface of the connection portion 54.

Each of the main frames 8 (the detachable frame portion 50 and the fixed main frame 51) is coupled to the joint portion 56 such that the main portion 66 extends rearward and downward continuously in the vehicle lengthwise direction from a rear end of the projecting portion 61 at the upper side. In addition, each of the main frames 8 is coupled to the joint portion 56 such that the down portion 67 extends downward and rearward continuously in the vehicle lengthwise direction from a rear end of the projecting portion 61 at the lower side. Therefore, a forward load from the main frame 8 smoothly acts on the joint portion 56, and the load acting on the joint portion 56 smoothly acts on the ceiling plate 64, the bottom plate 63, and the pipe portion 55 via the projecting portion 61. Therefore, an unnecessary stress concentration at the rear portion of the joint portion 56 and the front end portions of the main frames 8 can be avoided. The load acting on the joint portion 56 from the main portions 66 can also be made to act on the inclined portions 65. Thus, the load acting on an upper portion of the head pipe 7 can be reduced.

Each of the main frames 8 includes bosses 70a and 70b through which the fastening members 81 (see FIG. 1) for coupling the power supply unit 20 with the main frame 8 are inserted. As described above, the engagement holes 34a and 34b (see FIG. 3) which engage with the fastening members 81 are provided at the supporting body 33 so as to be respectively located at the front and rear sides (see FIG. 3). For example, the engagement holes 34a are respectively formed at the left and right end portions of the coupling pipe 33t (see FIG. 3), and the engagement holes 34b are respectively formed at the left and right end portions of the rear pipe 33s (see FIG. 3). The bosses 70a and 70b form a pair in the forward and rearward direction so as to correspond to the engagement holes 34a and 34b. The boss 70a at the front side is provided at the lower end portion of the down portion 67, and the boss 70b at the rear side is provided at a rear end portion of the main portion 66 and in front of a part of the main portion 66 which is coupled to the pivot frame 9. When the main frames 8 are coupled to the power supply unit 20, as described above, the supporting body 33 can couple the left and right main frames 8 to each other in the vehicle width direction to reinforce the vehicle body frame 4. In a side view, a triangle is formed by: the coupling portion 69; a portion of the main portion 66 which extends rearward from a portion from which the coupling portion 69 branches; and a portion of the left or right pipe 33p or 33q of the supporting body 33 which extends between the coupling pipe 33t and the rear pipe 33s in the vehicle lengthwise direction. The main frames 8 and the supporting body 33 constitute a highly-stiff frame structure in cooperation with one another, and this significantly contributes to the improvement of the stiffness of the entire vehicle body frame 4.

Figure 7:
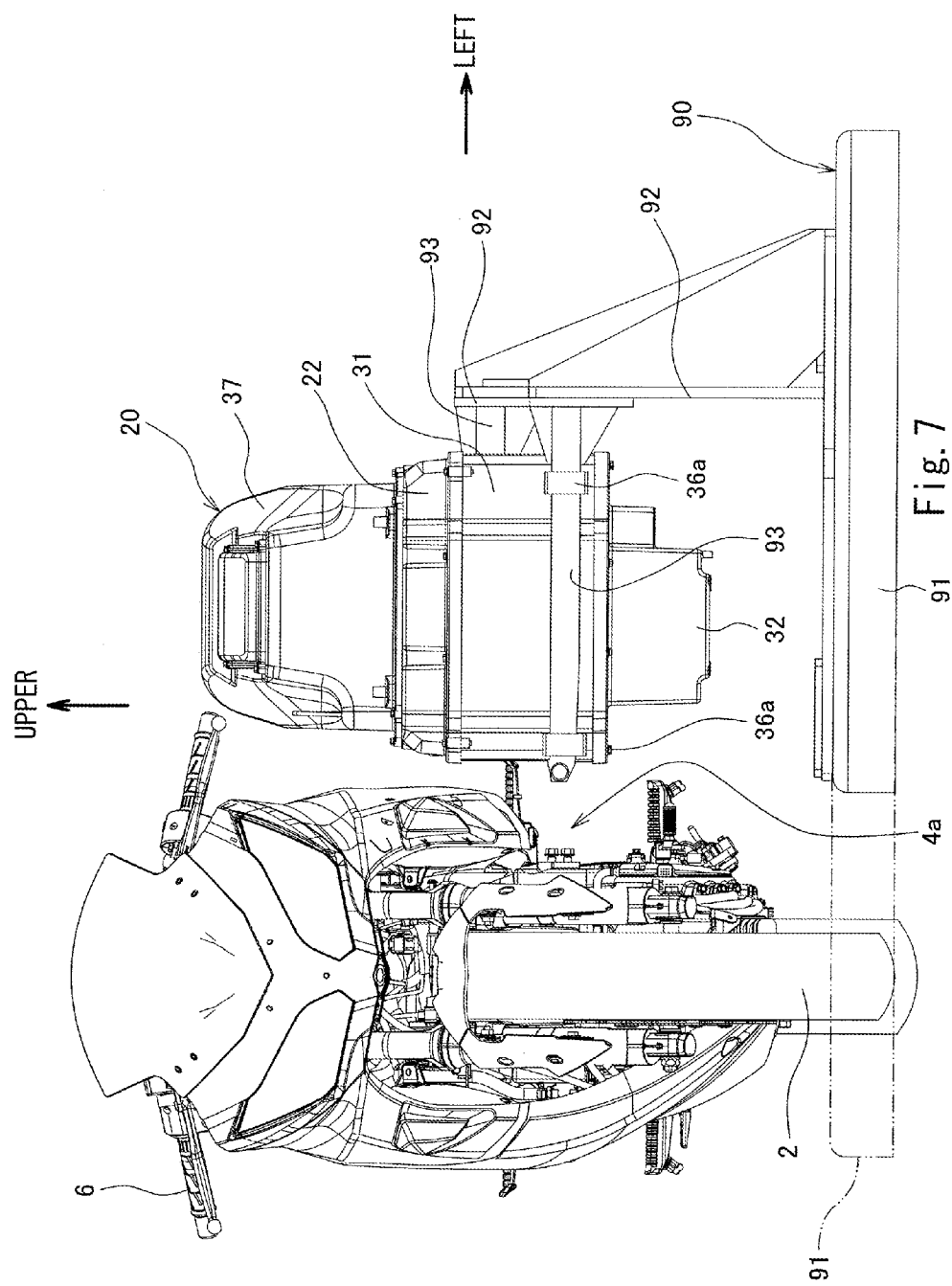
FIG. 7 is a front view showing the same state as FIG. 6.

FIG. 6 is a perspective view showing a state before the power supply unit 20 is mounted to the vehicle body of the electric motorcycle 1 shown in FIG. 1. FIG. 7 is a front view showing the same state as FIG. 6. Hereinafter, the procedure of assembling the power supply unit 20 to the vehicle body will be explained in order.

First, the vehicle body to which the power supply unit 20 is to be mounted is prepared. The vehicle body herein is configured by mounting the front wheel 2, the swing arm 10, the rear wheel 3, the motor unit 15, the power transmission mechanism 18, and the inverter unit 25 to the remaining portion of the vehicle body frame 4. The vehicle body herein does not include the detachable frame portion 50. In a case where the completed vehicle includes a cowling, a cowl member (for example, a left side cowl) arranged at the vehicle width outer side of the detachable frame portion 50 is not included in the vehicle body and is detached.

The motor unit 15 is cantilevered by the pivot frame 9 so as to project forward from the pivot frame 9. As described above, the pivot frame 9 includes the left and right side walls. A panel 71 having a substantially rectangular shape is arranged between the left and right side walls of the pivot frame 9 such that surfaces thereof respectively face forward and rearward. The panel 71 is fixed to inner surfaces of the left and right side walls of the pivot frame 9. The motor unit 15 is fixed to the panel 71 by a plurality of bolts inserted from behind and is cantilevered by the pivot frame 9 via the panel 71. Such a support structure is adopted, so that even in a case where the motor unit 15 is not coupled to the power supply unit 20, the motor unit 15 can be maintained to be firmly mounted to the remaining portion of the vehicle body frame 4.

In the vehicle body prepared as above, the accommodating space 4a is open at one vehicle width direction side (for example, the left side) to which the detachable frame portion 50 is attached. Regarding the vehicle lengthwise direction, the accommodating space 4a is formed between the front wheel 2 and the rear wheel 3. Further, the accommodating space 4a is formed behind the head pipe 7 and in front of the inverter unit 25. Furthermore, the accommodating space 4a is formed in front of at least one of the seat 12, the seat frame 11, and the pivot frame 9. Regarding the upper-lower direction, the accommodating space 4a is largely formed above the motor unit 15. In consideration of the ease of the attaching and detaching work, it is preferable that the accommodating space 4a be provided as low as possible. In the present embodiment, a lower end of the accommodating space 4a is located above a road surface and under upper ends of the front and rear wheels 2 and 3. However, as another example, the lower end of the accommodating space 4a may be located under the axles of the front and rear wheels 2 and 3. Regarding the vehicle width direction, the accommodating space 4a is formed at the vehicle width inner side of the fixed main frame 51.

The motor unit 15 is one of components surrounding the accommodating space 4a. The electric motor 16 is arranged at a position excluding the accommodating space 4a and a region extended from the accommodating space 4a in the vehicle width direction, that is, a position which is separated from the accommodating space 4a in the upper and lower directions and the forward direction and/or the rearward direction and does not overlap the accommodating space 4a in a side view. A part of the power transmission mechanism 18 constitutes the motor unit 15 together with the electric motor 16, and another part of the power transmission mechanism 18 is located at the vehicle width outer side of the motor unit 15 and extends in the vehicle lengthwise direction. The arrangement relation between the power transmission mechanism 18 and the accommodating space 4a is similar to the above-described arrangement relation between the electric motor 16 and the accommodating space 4a. Therefore, when inserting the power supply unit 20 into the accommodating space 4a, the electric motor 16 and the power transmission mechanism 18 do not interfere with the power supply unit 20. Conversely, even in a case where the electric motor 16 and the power transmission mechanism 18 are mounted to the remaining portion of the vehicle body frame 4, the power supply unit 20 can be easily accommodated in the accommodating space 4a.

Then, the vehicle body is placed on a standing jig (not shown) and kept in a standing posture by two-point ground contact by the front wheel 2 and the rear wheel 3. At this time, the side stand 13 is in the horizontal posture. A mounting device 90 stands by at the vehicle width outer side of vehicle body and a side where the accommodating space 4a is open.

The mounting device 90 includes: a base 91; a pair of posts 92 standing from one side edge of the base 91; and a pair of forks 93 respectively, horizontally extending from the posts 92. The mounting device 90 is placed next to the vehicle body such that: the posts 92 are spaced apart from each other in the vehicle lengthwise direction; the one side edge of the base 91 is arranged at a distance from the accommodating space 4a; and the forks 93 are spaced apart from each other in the vehicle lengthwise direction as with the posts 92 and extend from the posts 92 to the vehicle width inner side. The fork 93 at the front side is inserted through a front holder 36a, fixed to an outer front surface of the power supply case 22, from the vehicle width outer side to the vehicle width inner side. The fork 93 at the rear side is inserted through a rear holder 36b, fixed to an outer rear surface of the power supply case 22, from the vehicle width outer side to the vehicle width inner side. With this, the power supply unit 20 is supported by the mounting device 90 so as to be lifted from the ground. At this time, as described above and as will be described later, by moving the power supply unit 20 in the vehicle width direction, the power supply unit 20 is accommodated in the accommodating space 4a. Therefore, the power supply unit 20 only needs to be to be lifted up to a height which is the same as the height of the mounted state.

Next, the power supply unit 20 is moved to the vehicle width inner side. In this case, as virtually shown in FIG. 7, the base 91 may be moved to the vehicle width inner side. In this case, the base 91 is constituted by a cart which can travel in at least a direction in which the forks 93 extend, and the height of the base 91 is made shorter than a distance from the ground to a lower end of the motor unit 15. Since the lower end of the accommodating space 4a is located above the road surface, the base 91 can be inserted under the motor unit 15, and a traveling direction front end portion of the base 91 can be inserted to a position under the accommodating space 4a. Thus, the power supply unit 20 can be smoothly accommodated in the accommodating space 4a. The side stand 13 is in the horizontal posture, so that even in a case where the side where the accommodating space 4a is open and the side where the side stand 13 is arranged are the same as each other in the vehicle width direction when viewed from the vehicle width center line, the side stand 13 does not interfere with the movement of the base 91. As another example, the posts 92 may be moved to the vehicle width inner side relative to the base 91. In this case, sliders which slide in the direction in which the forks 93 extend are provided on the base 91, and the posts 92 are attached on the sliders. The forks 93 may extend in the vehicle width direction. In this case, the forks 93 are configured to be extendable.

When the power supply unit 20 is moved to the vehicle width inner side, as described above, the power supply unit 20 is inserted into the accommodating space 4a through the open portion at the vehicle width outer side.

FIG. 8 is a diagram showing the arrangement of the rear first mount portions 35b and the rear second mount portions 72b. As shown in FIG. 8, in the present embodiment, when viewed from the vehicle width center line, the side where the clutch accommodating section 17c is arranged is opposite in the vehicle width direction to the side where the accommodating space 4a is open. As described above, among the components accommodated in the motor case 17, the clutch is relatively large in diameter. Therefore, the clutch accommodating section 17c may be formed to project in a radial direction when viewed from a remaining portion of the motor case 17 (for example, the motor accommodating section 17a and the transmission unit accommodating section 17b). In the present embodiment, when viewed from the vehicle width center line, the side (for example, the left side) where the accommodating space 4a is open is opposite to the side (for example, the right side) where the clutch accommodating section 17c is arranged. Therefore, the power supply unit 20 can be accommodated in the accommodating space 4a without getting over the clutch accommodating section 17c. Thus, a space above the motor accommodating section 17a and the transmission unit accommodating section 17b can be easily utilized as the accommodating space 4a.

A plurality of (for example, four) second mount portions 72a and 72b corresponding to the first mount portions 35a and 35b are formed on an upper surface of the motor case 17. In the process of inserting the power supply unit 20 into the accommodating space 4a, the four first mount portions 35a and 35b are brought into contact with the corresponding second mount portions 72a and 72b in the vehicle width direction. The first mount portions 35a and 35b are brought into contact with the corresponding second mount portions 72a and 72b from the side (for example, the left side) where the accommodating space 4a is open in the vehicle width direction when viewed from the second mount portions 72a and 72b.

Therefore, the front first mount portion 35a located at the side (for example, the right side) where the fixed main frame 51 is provided needs to pass over the front second mount portion 72a located at the side (for example, the left side) where the accommodating space 4a is open. Then, only by moving the power supply unit 20 horizontally in the vehicle width direction, the two front first mount portions 35a are properly brought into contact with the front second mount portions 72a. The same is true for the rear first mount portions 35b and the rear second mount portions 72b, and the same is true for the process of taking out the power supply unit 20 from the accommodating space 4a. Therefore, when supporting the motor unit 15 by the power supply unit 20, this support structure is prevented from hindering the work of attaching and detaching the power supply unit 20. In addition, the necessity of securing a space above the motor unit 15 just for allowing the movements of the first mount portions 35a and 35b decreases.

As above, in a case where the first mount portions 35a and 35b contact the second mount portions 72a and 72b in the vehicle width direction with proper positional relations, the power supply unit 20 is properly accommodated in the accommodating space 4a. Then, the fastening members 83 are inserted into the mount portions 34a, 34b, 72a, and 72b from the vehicle width outer sides. Thus, the motor unit 15 is coupled to the power supply unit 20.

Referring again to FIG. 1, at this time, the engagement holes 34a and 34b formed at the power supply unit 20, specifically the front engagement hole 34a and the rear engagement hole 34b which are provided at a side opposite to the side where the accommodating space 4a is open in the vehicle width direction match with the front boss 70a and rear boss 70b of the fixed main frame 51 in the vehicle width direction. The fastening members 81 are inserted into the bosses 70a and 70b and the corresponding engagement holes 34a and 34b from the vehicle width outer side to the vehicle width inner side and engage with the engagement holes 34a and 34b. With this, the fixed main frame is detachably coupled to the power supply unit 20 (specifically the supporting body 33, more specifically the coupling pipe 33t and rear pipe 33s of the supporting body 33). Thus, the power supply unit 20 is properly accommodated in the accommodating space 4a, is supported by the remaining portion of the vehicle body frame 4, and supports the motor unit 15 together with the vehicle body frame 4. The detachable frame portion 50 may be fixed to the power supply unit 20 before the power supply unit 20 is lifted up by the mounting device 90.

Next, the detachable frame portion 50 is detachably coupled to the remaining portion of the vehicle body frame 4. To be specific, as briefly described above, the inner surface of the connecting plate 68 provided at the front end portion of the detachable frame portion 50 is brought into surface-contact with the connection plate 58 of the head pipe 7 from the vehicle width outer side, and the inner surface of the rear end portion of the detachable frame portion 50 is brought into surface-contact with the connection portion 54 of the pivot frame 9 from the vehicle width outer side. At this time, the through holes 52 formed on the connecting plate 68 are matched in the vehicle width direction with the engagement holes 53 which are open on the connection plate 58, and the through holes 52 formed on the rear end portion are matched in the vehicle width direction with the engagement holes 53 which are open on the surface of the connection portion 54. Then, the fastening members 82 are inserted into the through holes 52 and the engagement holes 53 and engage with the engagement holes 53. With this, the detachable frame portion 50 is detachably coupled to the head pipe 7 and the pivot frame 9 which serve as the remaining portion of the vehicle body frame 4. Thus, the accommodating space 4a is closed by the fixed main frame 51 and the detachable frame portion 50 in the vehicle width direction.

Then, wire connecting work required among the electric components provided at the power supply unit 20 and the electric components provided at the vehicle body is performed. Connectors for these works are arranged on an outer surface of the power supply case 22. By connecting the wires of the vehicle body to these connectors, required electrical connections are properly realized. Thus, the wire connecting work is completed. In the present embodiment, the inverter 26 and the low-voltage power supply are arranged outside the power supply unit 20, and by attaching or detaching the connectors, the wire connecting work between the power supply 21 and the inverter 26 and between the power supply 21 and the low-voltage power supply is performed. Thus, the power supply unit 20 can be easily shifted to an attachable and detachable state.

As above, according to the present embodiment, the vehicle body frame 4 is configured such that the accommodating space 4a accommodating the power supply unit 20 can be open in the vehicle width direction. Therefore, when mounting the power supply unit 20 to the vehicle body, the power supply unit 20 only needs to be lifted up to a height which is substantially the same as the height of the mounted state. Then, the power supply unit 20 is moved in the vehicle width direction through the open portion of the accommodating space 4a. Thus, the power supply unit 20 can be accommodated in the accommodating space 4a through the open portion of the accommodating space 4a. With this, the work of mounting the power supply unit 20 to the vehicle body can be easily performed.

Especially, in the present embodiment, the power supply 21 accommodated in the power supply case 22 includes a power supply portion positioned so as not to hinder the insertion of the forks 93 into the power supply case 22 and projecting to a lower side of the supporting surface. With this, the capacity of the power supply 21 can be made large. In the present embodiment, the power supply portion projecting downward from the supporting surface is formed at a position spaced apart in the forward and rearward direction from the positions to which the forks 93 are inserted, specifically, at a front portion of the power supply case 22. The power supply case 22 includes the downward projecting portion 32 accommodating the power supply portion.

As above, to effectively utilize the space between the motor unit 15 and the front wheel 2, the power supply unit 20 of the present embodiment includes the downward projecting portion 32 projecting downward from the front portion of the main case portion 31, and a lower end of the downward projecting portion 32 is substantially the same in height as the lower end of the motor unit 15. In the case of accommodating the power supply unit 20 configured as above in the accommodating space 4a from the upper side as with the conventional method, the entire power supply unit 20 including the portions arranged at low positions in a mounting state needs to be lifted up to a position higher than the main frame 8. Therefore, the mounting work becomes extremely complex. In the present embodiment, the portions arranged at the low positions in the mounting state can be accommodated in the accommodating space 4a only by lifting up the portions to those positions. Therefore, it is possible to avoid a case where the complexity of the mounting work increases depending on the position of the power supply unit 20 in the upper-lower direction. Conversely, while facilitating the mounting work, the center of gravity of the vehicle can be lowered by utilizing the power supply unit 20, and the utilization of the lower space of the vehicle by the arrangement of the power supply can be realized.

Modification Example

The foregoing has explained the embodiment of the present invention. However, the above configuration is just one example, and modifications, additions, and deletions may be made within the scope of the present invention.

For example, the main frame constituted by the detachable frame portion 50 may be arranged at a side opposite in the vehicle width direction to a side where the power transmission mechanism 18 (especially, the drive mechanism 18d) is arranged. When the driving force generated by the electric motor is transmitted to the rear wheel 3 to cause the vehicle to travel forward, the load from the power transmission mechanism 18 acts on the vehicle body frame 4 through the axle of the rear wheel 3 and the swing arm 10. This load becomes high at one vehicle width direction side, where the drive mechanism 18d is arranged, of the vehicle body frame 4. In a case where the detachable frame portion 50 is arranged at a side opposite to the side where the drive mechanism 18d is arranged, the fixed main frame 51 can receive the load from the power transmission mechanism 18, and the load from the power transmission mechanism 18 hardly acts on the detachable frame portion 50. Therefore, the required stiffness of the detachable frame portion 50 can be reduced, and the structure for attaching the detachable frame portion 50 to the remaining portion can be simplified.

In a case where the position of the detachable frame portion 50 is associated with the position of the power transmission mechanism 18 as above, and the stiffness of the fixed main frame 51 is made greater than that of the detachable frame portion 50 as in the above embodiment, the stiffness can be suitably improved at the side where the load from the power transmission mechanism tends to be received. Thus, the vehicle body frame 4 suitable for an acting load distribution can be provided.

The power supply 21 included in the power supply unit 20 only needs to be able to supply electric power to the electric motor 16. Examples of the power supply 21 include: a battery, such as a lithium ion battery, utilizing a chemical reaction; a battery using a capacitor electrically storing electric charge; a battery (such as a fuel cell) including a power generating unit, secondary battery chargeable by an external power supply or an internal power generator; and a primary battery replaced with a new one every time the amount of charge decreases.

In the above embodiment, the opening through which the power supply unit 20 is attached and detached is formed by detaching a part of the vehicle body frame 4 from the remaining portion of the vehicle body frame 4. However, the vehicle body frame 4 does not have to include such a detachable frame. An opening through which the power supply unit 20 can pass in the vehicle width direction may be formed at the vehicle body frame 4 in advance.

The saddle type electric vehicle is not limited to the electric motorcycle which travels by an output equal to an output of a motorcycle driven by an internal combustion engine and may be an electric bicycle. Further, the saddle type electric vehicle may be a buggy car, such as an ATV, including three or more wheels. Furthermore, the saddle type electric vehicle may be a vehicle on which a rider rides in such a riding posture that the legs are put together in front of the seat, not in such a riding posture that the rider completely sits astride the seat, such as a scooter.

The vehicle body may be provided with a center stand by which the vehicle can stand while maintaining a horizontal state of the axle. Since the holders 36a and 36b extend horizontally, a device which props up the vehicle body for insertion of the forks 93 becomes unnecessary. On the other hand, the holders 36a and 36b may be attached such that the openings of the holders 36a and 36b become horizontal when the vehicle body stands in the inclined state by the side stand 13.

In the above embodiment, the inverter case 27 is physically separated from the power supply case 22. However, the inverter 26 and the low-voltage power supply may be accommodated in the power supply unit 20.

INDUSTRIAL APPLICABILITY

The present invention has the above-described effects and is suitably applicable to an electric vehicle which is a saddle type vehicle and travels by using an electric motor as a power source.

REFERENCE CHARACTER LIST 1 electric motorcycle
2 front wheel
3 rear wheel
4 vehicle body frame
7 head pipe
8 main frame
9 pivot frame
15 motor unit
16 electric motor
20 power supply unit
21 power supply
22 power supply case
25 inverter unit
33 supporting body
50 detachable frame portion
51 fixed main frame
55 pipe portion
56 joint portion
82 fastening member

The invention claimed is:

1. A saddle electric vehicle which travels by using an electric motor as a power source,
the saddle electric vehicle comprising:
a power supply unit including a power supply for the electric motor;
a vehicle body frame including a head pipe and a pair of left and right main frames extending rearward from the head pipe, the vehicle body frame defining an accommodating space located between front and rear wheels and accommodating the power supply unit; and
a power transmission mechanism configured to transmit driving force, generated by the electric motor, to a driving wheel, wherein:
one of the main frames constitutes a detachable frame portion located at an outer side of the power supply unit in a vehicle width direction, defining the accommodating space, and detachably coupled to a remaining portion of the vehicle body frame;
by detaching the detachable frame portion from the remaining portion, the accommodating space is open in the vehicle width direction such that the power supply unit is attachable to and detachable from the accommodating space in the vehicle width direction;

the power transmission mechanism is provided at one of two vehicle width direction sides relative to a vehicle width center line; and the one main frame constituting the detachable frame portion is provided at the other vehicle width direction side opposite to the one vehicle width direction side where the power transmission mechanism is provided.

2. The saddle electric vehicle according to claim 1, wherein the detachable frame portion is detachably fastened to the remaining portion by fastening members inserted into and disengaged from the remaining portion in the vehicle width direction in a state where front and rear end portions of the detachable frame portion contact the remaining portion from vehicle width direction outer sides.

3. The saddle electric vehicle according to claim 1, wherein:
the power supply unit includes a supporting body supporting the power supply from below; and
the supporting body is supported by the remaining portion via the detachable frame portion.

4. The saddle electric vehicle according to claim 3, wherein the supporting body is coupled to the detachable frame portion at a plurality of positions spaced apart from one another in a forward and rearward direction.

5. The saddle electric vehicle according to claim 1, further comprising
a swing arm including a front end portion supported by the vehicle body frame such that the swing arm is swingable around a swing axis, wherein
the electric motor and the power transmission mechanism are arranged in front of the swing axis so as not to overlap the accommodating space in a side view.

6. The saddle electric vehicle according to claim 1, further comprising a swing arm including a front end portion supported by the vehicle body frame such that the swing arm is swingable around a swing axis, wherein
the accommodating space is defined by the vehicle body frame except for the swing arm.

7. The saddle electric vehicle according to claim 6, wherein the accommodating space is arranged in front of the swing axis.

8. The saddle electric vehicle according to claim 1, further comprising a swing arm including a front end portion supported by a pivot frame of the vehicle body frame such that the swing arm is swingable around a swing axis, wherein
the detachable frame portion is detachably coupled to a head pipe of the vehicle body frame and the pivot frame.

9. The saddle electric vehicle according to claim 1, further comprising a swing arm including a front end portion supported by the vehicle body frame such that the swing arm is swingable around a swing axis, wherein:
the vehicle body frame includes a detachable frame portion defining the accommodating space;
the electric motor is arranged behind the power supply unit; and
the detachable frame portion is detachably coupled to a head pipe of the vehicle body frame and the power supply unit.

10. A saddle electric vehicle which travels by using an electric motor as a power source,
the saddle electric vehicle comprising:
a power supply unit including a power supply for the electric motor; and
a vehicle body frame including a head pipe and a pair of left and right main frames extending rearward from the head pipe, the vehicle body frame defining an accommodating space located between front and rear wheels and accommodating the power supply unit, wherein:
the vehicle body frame is configured such that the power supply unit is attachable to and detachable from the accommodating space in a vehicle width direction:
the vehicle body frame includes a detachable frame portion located at an outer side of the power supply unit in a vehicle width direction and defining the accommodating space;
the detachable frame portion is detachably coupled to a remaining portion of the vehicle body frame;
by detaching the detachable frame portion from the remaining portion, the accommodating space is open in the vehicle width direction;
the detachable frame portion constitutes at least one of the main frames;
the head pipe includes a cylindrical pipe portion and a box-shaped joint portion provided at a rear portion of the pipe portion; and
the main frames are respectively coupled to left and right rear portions of the joint portion.

11. A saddle electric vehicle which travels by using an electric motor as a power source,
the saddle electric vehicle comprising:
a power supply unit including a power supply for the electric motor; and
a vehicle body frame including a head pipe and a pair of left and right main frames extending rearward from the head pipe, the vehicle body frame defining an accommodating space located between front and rear wheels and accommodating the power supply unit, wherein:
the vehicle body frame is configured such that the power supply unit is attachable to and detachable from the accommodating space in a vehicle width direction:
the vehicle body frame includes a detachable frame portion located at an outer side of the power supply unit in a vehicle width direction and defining the accommodating space;
the detachable frame portion is detachably coupled to a remaining portion of the vehicle body frame;
by detaching the detachable frame portion from the remaining portion, the accommodating space is open in the vehicle width direction;
the detachable frame portion constitutes one of the main frames; and
the other main frame has a greater stiffness than the one main frame.

* * * * *